United States Patent
Hwang et al.

(10) Patent No.: US 11,731,649 B2
(45) Date of Patent: Aug. 22, 2023

(54) HIGH PRECISION POSITION ESTIMATION METHOD THROUGH ROAD SHAPE CLASSIFICATION-BASED MAP MATCHING AND AUTONOMOUS VEHICLE THEREOF

(71) Applicants: HYUNDAI MOTOR COMPANY, Seoul (KR); KIA CORPORATION, Seoul (KR); Konkuk University Industrial Cooperation Corp, Seoul (KR)

(72) Inventors: Dae-Sung Hwang, Hwaseong-si (KR); Cho-Rong Ryu, Incheon (KR); Ka-Min Kim, Seongnam-si (KR); Ji-Min Jeong, Seoul (KR); Ki-Chun Jo, Seoul (KR); Sang-Kwon Kim, Seoul (KR)

(73) Assignees: Hyundai Motor Company, Seoul (KR); Kia Corporation, Seoul (KR); Konkuk University Industrial Cooperation Corp, Seoul (KR)

( * ) Notice: Subject to any disclaimer, the term of this patent is extended or adjusted under 35 U.S.C. 154(b) by 189 days.

(21) Appl. No.: 17/462,823

(22) Filed: Aug. 31, 2021

(65) Prior Publication Data

US 2022/0176989 A1    Jun. 9, 2022

(30) Foreign Application Priority Data

Dec. 9, 2020  (KR) .................. 10-2020-0171076

(51) Int. Cl.
G01C 21/16      (2006.01)
B60W 60/00      (2020.01)
G01C 21/34      (2006.01)

(52) U.S. Cl.
CPC .......... *B60W 60/001* (2020.02); *G01C 21/16* (2013.01); *G01C 21/3461* (2013.01); *B60W 2520/14* (2013.01); *B60W 2552/15* (2020.02); *B60W 2552/30* (2020.02); *B60W 2552/53* (2020.02)

(58) Field of Classification Search
CPC .......... B60W 60/001; B60W 2552/53; B60W 2552/30; B60W 2552/15; B60W 2520/14; G01C 21/16; G01C 21/3461
See application file for complete search history.

(56) References Cited

FOREIGN PATENT DOCUMENTS

KR     10-2018-0103462 A      9/2018

*Primary Examiner* — Redhwan K Mawari
*Assistant Examiner* — Jeffrey R Chalhoub
(74) *Attorney, Agent, or Firm* — Fox Rothschild LLP

(57) ABSTRACT

A high precision position estimation method through a road shape classification-based map matching implemented by a high precision position estimation system of an autonomous vehicle includes classifying a road into a straight lane, a curved lane, and a clothoid curve lane by the lane matching between a sensor lane segment and a map lane segment, generating a movement amount value calculated by applying a geometric feature-based map matching or an optimization-based map matching to the classified lane as a covariance matrix, and calculating the latitude, longitude, and traveling direction of a vehicle to be estimated by combining the covariance matrix with sensor measurement values of a vehicle speed and a yaw rate by an extended Kalman filter.

17 Claims, 11 Drawing Sheets

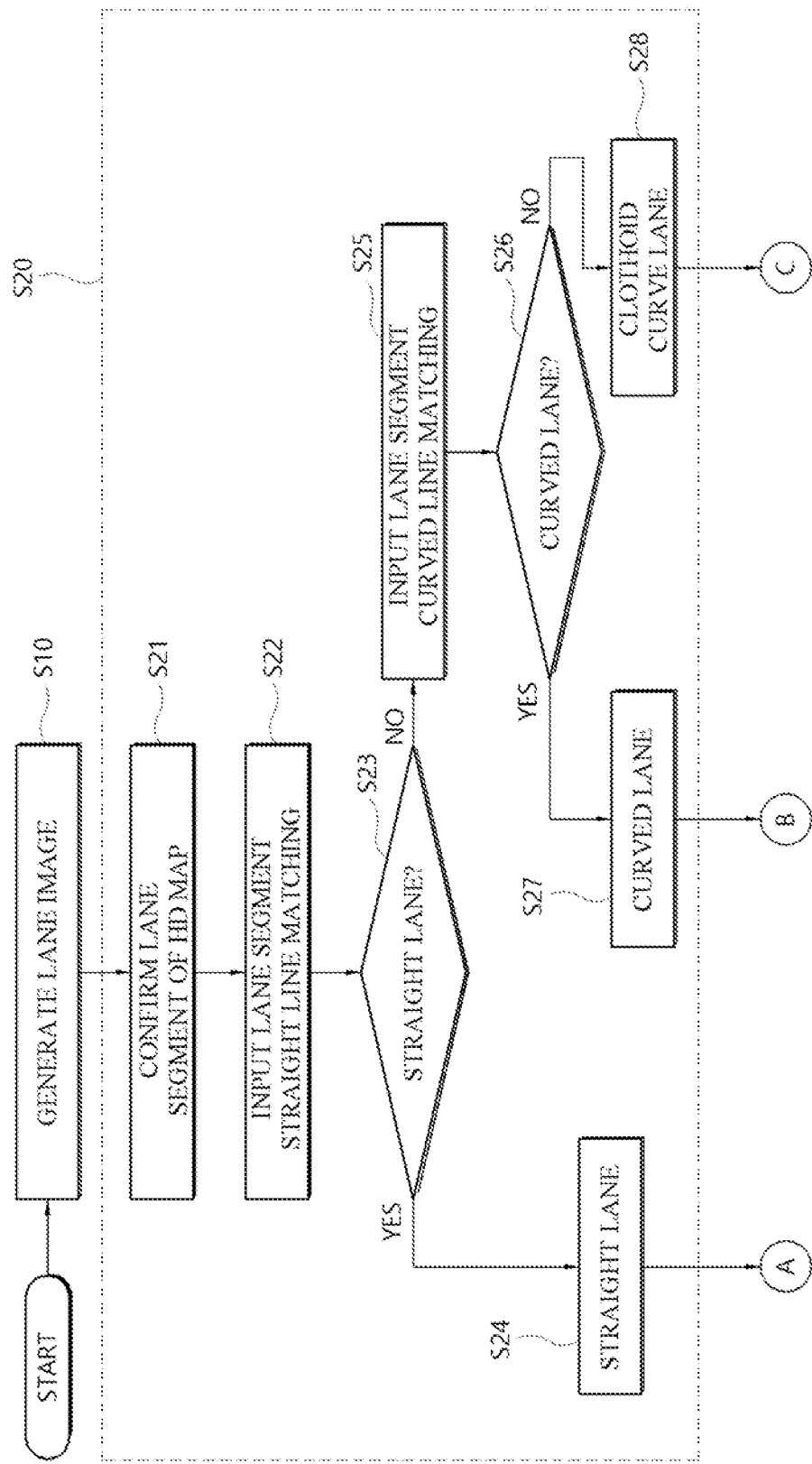

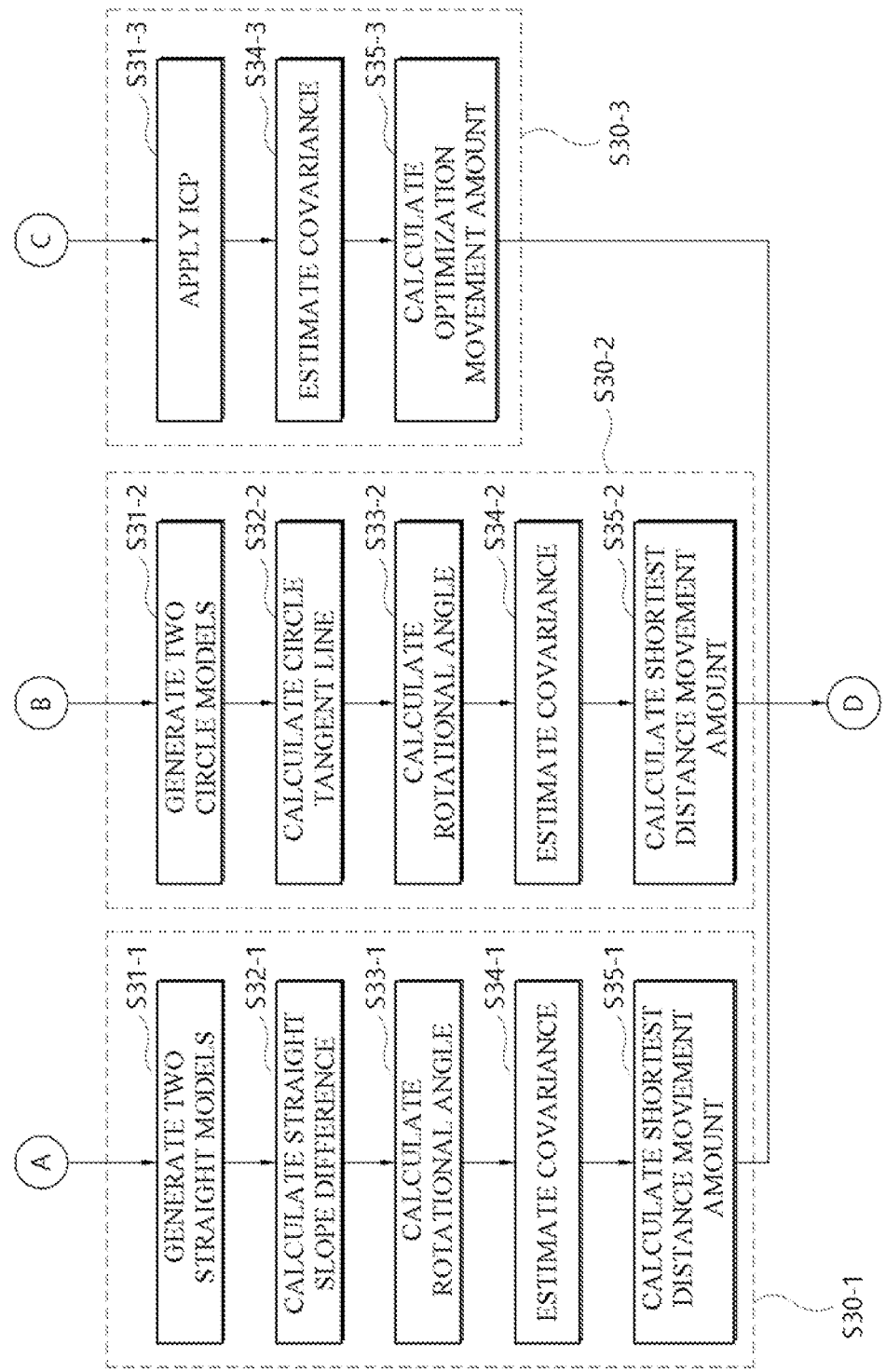

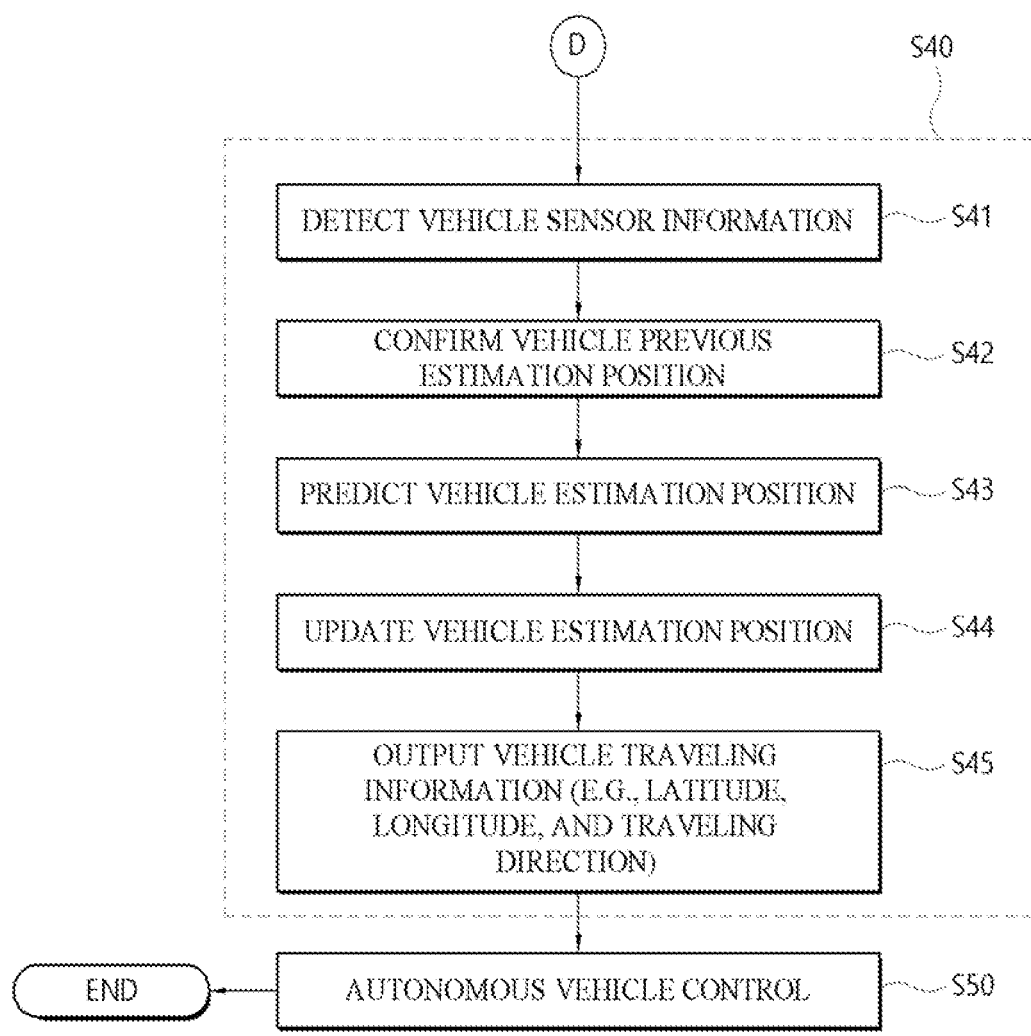

FIG.6
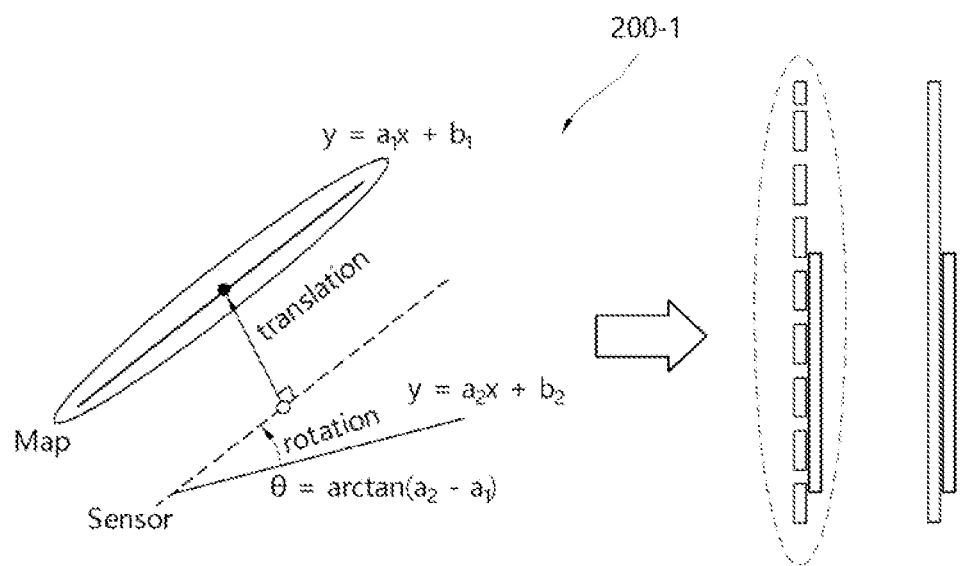
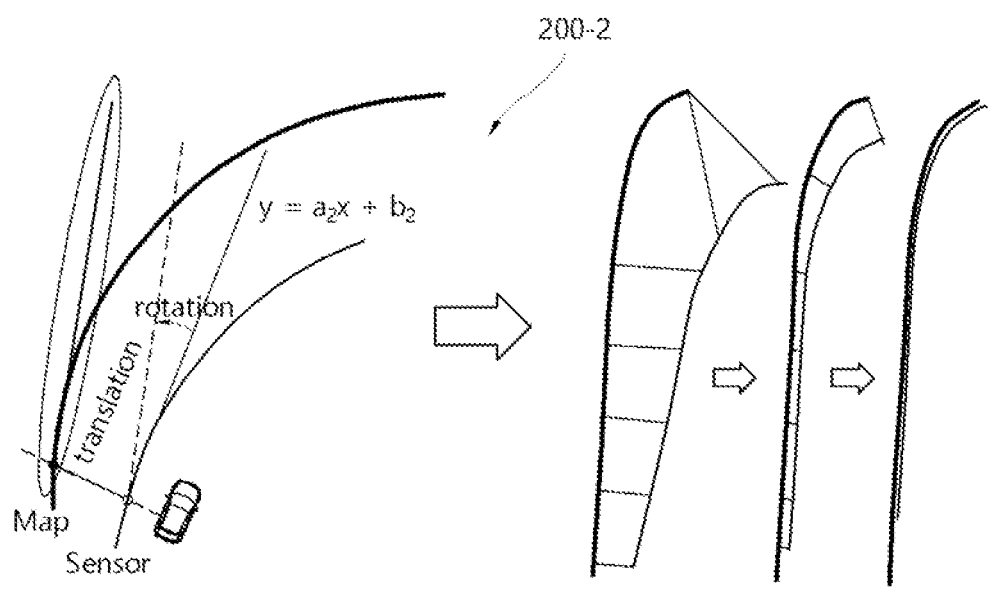

HIGH PRECISION POSITION ESTIMATION METHOD THROUGH ROAD SHAPE CLASSIFICATION-BASED MAP MATCHING AND AUTONOMOUS VEHICLE THEREOF

CROSS-REFERENCE TO RELATED APPLICATION

This application claims priority to and the benefit of Korean Patent Application No. 10-2020-0171076, filed on Dec. 9, 2020, which is incorporated herein by reference in its entirety.

TECHNICAL FIELD

The present disclosure relates to the position estimation of an autonomous vehicle, and particularly, to an autonomous vehicle which may perform the high precision position estimation through the road shape classification-based map matching.

BACKGROUND

Generally, a level classification applied to an autonomous vehicle is expressed in Table 1 below.

TABLE 1

| Level | Summary | Contents | System |
|---|---|---|---|
| Level 0 | Automation X | A driver fully controls a vehicle | — |
| Level 1 | Driver assistance | Steering, acceleration/deceleration automation driver assistance | Cruise control system (cruise control_ACC) |
| Level 2 | Partial autonomous traveling | A vehicle and a lane are perceived when traveling on the highway An interval with the preceding vehicle is maintained, a driver looks around | Advanced smart cruise control (ASCC) Lane keeping assistance (LKAS) |
| Level 3 | Conditional autonomous travel | An autonomous traveling is possible in a pre-determined section. The driver looks around the neighbor situation to prepare for the unexpected situation | Advanced driver assistance system (ADAS) |
| Level 4 | Advanced autonomous traveling | All safety may be removed in a specific road condition | LIDAR system |
| Level 5 | Full autonomous traveling | All functions such as traveling and parking are automated without driver's intervention | Connected system |

Therefore, the autonomous vehicle requires an autonomous traveling precision map (HD map) for Levels 3 to 5, and the autonomous traveling precision map should satisfy the high precise positioning accuracy and reliability of 0 to 20 cm.

To this end, the autonomous traveling precision map uses the landmark information and the perception system feature information matching as the precise positioning technology, and the reason is why this is suitable for the map matching because the landmark information has different features such as a sensor perception rate and the observability according to the type and the lane exists in almost all urban traveling environments.

Particularly, the precision map and perception information for the lane may be provided in the polyline form to apply an optimization-based technique such as an iterative closest point (ICP) or a normal distribution transform (NDT).

As an example, the polyline is an output basic element indicating a line column connecting given point columns on a graph. The ICP and the NDT are optimization-based map matching techniques.

However, the optimization-based map matching technique has the difficulty in which the under-constrained shape matching error should be solved.

This reason is why the lane defines a mitigation curve on which the curvature is changed according to the classification of the road shape considering a road design criterion, and the map matching expresses the feature for the shape classifying the shape of the lane into a straight line and a curved line (or a circular arc) having the under-constrained shape together with a clothoid curve.

As an example, the under-constrained shape matching error means a problem in that one solution for the longitudinal component by divergence is not obtained in the straight condition upon matching of the ICP technique for a pair of polylines formed in the straight line or circular arc shape and one solution for the rotational component by divergence is not obtained in the circular arc condition, and the occurrence of the matching error reduces the accuracy of the position estimation on the straight traveling lane and the circular arc traveling lane when applied to all road shapes, thereby reducing the reliability for the precise positioning.

The contents described in Description of Related Art are to help the understanding of the background of the present disclosure, and may include what is not previously known to those skilled in the art to which the present disclosure pertains.

SUMMARY

Therefore, the present disclosure provides a high precision position estimation method through the road shape classification-based map matching and an autonomous vehicle thereof, which removes a matching error occurring due to the under-constrained shape for the straight and curved lanes by the road shape classification-based map matching, and particularly, also improves the precise positioning precision and stability by the removal of the under-constrained shape matching error applying the under-constrained shape classification, the geometric shape-based map matching, and the covariance estimation.

A high precision position estimation method through a road shape classification-based map matching of the present disclosure for achieving the object includes: generating lane classification information, which performs the lane matching between a sensor lane segment of lane image information and a map lane segment of an autonomous traveling precision map by a controller reading the lane image information of a road generated by a camera in an autonomous vehicle, and classifies the lane of the road into any one of a straight lane, a curved lane, and a clothoid curve lane by the lane matching; processing a map-sensor blending, which calculates straight line/curved line movement amounts by applying a geometric feature-based map matching technique to the straight lane and the curved lane, calculates a clothoid curve movement amount by applying an optimization-based map matching technique to the clothoid curve lane, generates a covariance matrix with the straight line/curved line movement amount calculation values or the clothoid curve movement amount calculation value, and calculates a vehicle state value by the covariance matrix; and estimating a vehicle position, which blends the covariance matrix with the sensor measurement value of a vehicle speed and a yaw rate generated by a vehicle sensor by an extended Kalman filter, and calculates one or more among the latitude, the longitude, and the traveling direction of the autonomous vehicle as the vehicle state value to be estimated, by the vehicle state estimator associated with the controller.

In some forms of the present disclosure, the generating of the lane classification information includes: performing the lane matching with the sensor lane segment based on the segment with respect to the map lane segment confirmed by reading the autonomous traveling precision map, and classifying the segment-based lane, which classifies the lane by generating an input lane segment by the lane matching, and determines the straight lane, the curved lane, or the clothoid curve lane.

In some forms of the present disclosure, the classifying of the segment-based lane includes: determining the straight lane from the input lane segment, and determining the curved lane or the clothoid curve lane from the input lane segment.

In some forms of the present disclosure, the straight lane is determined by the condition in which all points of the input lane segment are within a straight line model region generated by the start point and the end point. The curved lane is determined by the condition in which all points of the input lane segment are within a circle model region generated by the start point, the middle point, and the end point. The clothoid curve lane is determined by the condition in which all points of the input lane segment do not have the start point and the end point or the start point, the middle point, and the end point.

In some forms of the present disclosure, the processing of the map-sensor blending is classified the geometric feature-based map matching technique into a geometric feature-based map straight line matching technique applied to the straight lane, a geometric feature-based map curved line matching technique applied to the curved lane, and an optimization-based map matching technique applied to the clothoid curve lane.

In some forms of the present disclosure, the step of the geometric feature-based map straight line matching technique includes: generating two straight line models for the straight lane, calculating the straight line slope difference between the two straight lines, calculating a rotational angle from the straight line slope difference, performing the covariance estimation for the rotational angle, and generating the movement amount as the covariance matrix by calculating the movement amount as a shortest distance movement amount of the straight line.

In some forms of the present disclosure, the step of the geometric feature-based map curved line matching technique includes: generating two circle models for the curved lane, calculating a circle tangent line between the two circles, calculating a rotational angle from the difference between the circle tangent lines, performing the covariance estimation for the rotational angle, and generating the movement amount as the covariance matrix by calculating the movement amount as the shortest distance movement amount of the curved line.

In some forms of the present disclosure, the step of the optimization-based map matching technique includes: applying an ICP for the clothoid curve lane, performing the covariance estimation for the result of applying the ICP, and generating the movement amount as the covariance matrix by calculating the movement amount as an optimization movement amount of the clothoid curve.

In some forms of the present disclosure, the estimating of the vehicle position includes: confirming a previous estimation position for the autonomous vehicle with the sensor measurement value by a dead reckoning technique, performing the estimation position prediction by blending the covariance matrix with the previous estimation position by the extended Kalman filter, and updating and outputting a value of the estimation position prediction as vehicle traveling information which is one or more among the latitude, the longitude, and the traveling direction of the autonomous vehicle.

In some forms of the present disclosure, the estimation position prediction classifies the extended Kalman filter into a prediction step and a measurement update step, and the prediction step calculates the previous estimation position, and the measurement update step is performed by blending the covariance matrix with the previous estimation position.

Further, an autonomous vehicle of the present disclosure for achieving the object includes: a sensor for generating lane image information for a road by a camera, and detecting a vehicle speed and a yaw rate as sensor measurement values by a vehicle sensor; a precision map storage having a road map of an autonomous traveling precision map; and a high precision position estimation system for calculating and outputting one or more among latitude, longitude, and traveling direction of a vehicle, in which the high precision position estimation system includes: a controller for classifying a lane into any one of a straight lane, a curved lane, and a clothoid curve lane by the lane matching a sensor lane segment of the lane image information with a map lane segment of the autonomous traveling precision map, and generating the movement amount calculation values of geometric feature-based map matching techniques for the straight lane and the curved lane and the movement amount calculation value of an optimization-based map matching technique for the clothoid curve lane as a covariance matrix; and a vehicle state estimator for performing the estimation position prediction by blending the sensor measurement value with the covariance matrix by an extended Kalman filter, and calculating and outputting the latitude, the longitude, and the traveling direction by the estimation position prediction.

In some forms of the present disclosure, the controller provides a road perception unit for perceiving the sensor lane segment and the map lane segment, a lane classifier for classifying the lane into the straight lane, the curved lane, and the clothoid curve lane by the lane matching applying the lane segment, and the vehicle state estimator for calculating a movement amount calculation value from each of the straight lane, the curved lane, and the clothoid curve lane to generate the movement amount calculation values as the covariance matrix, and providing the covariance matrix to the vehicle state estimator.

In some forms of the present disclosure, the controller receives the sensor lane segment of the lane image information to a vehicle position perception unit, and the vehicle position perception unit is connected to the camera and the vehicle sensor.

In some forms of the present disclosure, the vehicle state estimator is composed of a position predictor for calculating a previous estimation position by a prediction step using the sensor measurement value, and a position updater for performing the estimation position prediction by a measurement update step of blending the previous estimation position with the covariance matrix.

In some forms of the present disclosure, the vehicle state estimator is connected to a signal output unit, and the signal output unit performs a vehicle control using the latitude, the longitude, and the traveling direction.

The high precision position estimation through the high precision position estimation system of the autonomous vehicle according to the present disclosure implements the following operations and effects.

First, it is possible to perform the position estimation of the autonomous vehicle without the occurrence of the matching error due to the divergence such as the application of the ICP technique through the road shape classification-based map matching, thereby preventing the adverse effects on the position estimation performance due to the matching error. Second, it is possible to classify the lane into the straight lane, the circular arc lane having the pre-determined curvature, and the clothoid curve lane through the road shape classification-based map matching, thereby generating more robust estimation position correction information suitable for the autonomous vehicle by the map matching technique according to the geometric shape of the lane. Third, it is possible to reduce the longitudinal distance error by the longitudinal matching for the position estimation of the autonomous vehicle. Fourth, the position estimation operation of the autonomous vehicle may have the relatively smaller operation amount than those of the repetition of the algorithm such as the ICP and the repetitive optimization function solution operation. Fifth, by improving the robustness and reliability of the position estimation according to the detection and compensation of the precision map-perception information matching error, the autonomous vehicle may stably implement the autonomous traveling of Levels 3 to 5.

DRAWINGS

FIGS. 1A, B and C are a flowchart illustrating a high precision position estimation method through a road shape classification-based map matching performed by a high precision position estimation system in an autonomous vehicle in some forms of the present disclosure.

FIG. 6 is a diagram illustrating the map matching measurement and covariance estimation state of the straight lane and the curved lane in some forms of the present disclosure.

DETAILED DESCRIPTION

Figure 2:
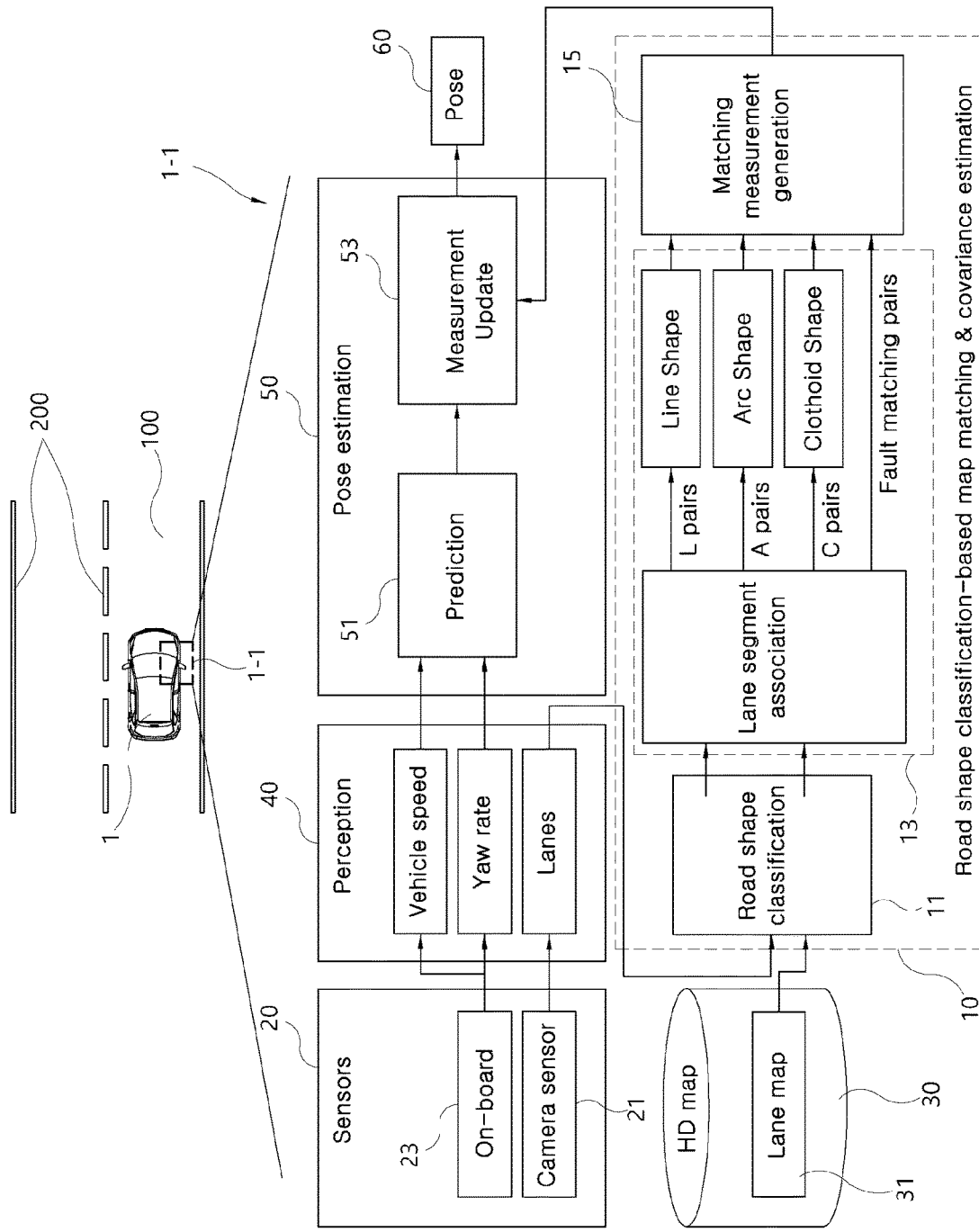
FIG. 2 is a diagram illustrating the autonomous vehicle having a high precision position estimation system implementing a high precision position estimation control through the road shape classification-based map matching in some forms of the present disclosure.

Hereinafter, an exemplary form of the present disclosure will be described in detail with reference to the accompanying exemplary drawings, and the exemplary form is an example and may be implemented in various different forms by those skilled in the art to which the present disclosure pertains, and thus is not limited to the exemplary form described herein.

Referring to FIGS. 1A, B and C, a high precision position estimation method through the road shape classification-based map matching classifies the lane of the traveling road into any one of the straight line, the curved line (e.g., the lane having the circular arc shape having a constant curvature), and the clothoid curve by applying generating lane classification information (S20) to generating lane image information (S10), and then completes the matching with the type of the lane of an autonomous traveling precision map (HD map) by applying a map-sensor blending processing step (S30-1 to S30-3), and thereafter, corrects and updates the vehicle position estimation on the traveling road by the HD map matching by applying estimating a vehicle position (S40), and thus applies the corrected and updated vehicle position estimation to an autonomous vehicle control (S50).

Particularly, the map-sensor blending processing step (S30-1 to S30-3) accurately matches a straight lane with a map by a geometric feature-based map straight line matching technique (S30-1), a curved lane with a map by a geometric feature-based map curved line matching technique (S30-2), and a clothoid curve lane with a map by an optimization-based map matching technique (S30-3), thereby solving the under-constrained shape matching error, and furthermore, largely increasing the matching accuracy between the traveling road and the landmark of the autonomous traveling precision map (HD map) in the estimating of the vehicle position (S40).

Therefore, the high precision position estimation method through the road shape classification-based map matching may be implemented by the features which precisely estimates the position of its own vehicle, which is currently traveling, on the traveling road by matching the lane landmark existing on the traveling road with a high precision road map of the HD map, thereby preventing the matching error due to the divergence when the optimization-based map matching technique without the classification of the straight line/curved line/clothoid curve is applied, providing more robust estimation position correction information, reducing the longitudinal distance error by adding the longitudinal matching, and not requiring the complicated operation such as the repetition of the algorithm or a process of obtaining the solution of an optimization function.

Therefore, the high precision position estimation method through the road shape classification-based map matching may improve the robustness and reliability of the position estimation according to the detection and compensation of the precision map-perception information matching error, thereby providing the stable autonomous traveling possibility of Levels 3 to 5.

Referring to FIG. 2, an autonomous vehicle 1 includes a high precision position estimation system 1-1.

Specifically, the high precision position estimation system 1-1 is composed of a controller 10, a sensor 20, a precision map storage 30, a vehicle position perception unit 40, a vehicle state estimator 50, and a signal output unit 60.

As an example, the controller 10 is composed of a road perception unit 11, a lane classifier 13, and a map matching processor 15, in which the road perception unit 11 confirms a lane 200 from the image of the road 100 captured by the sensor 20, the lane classifier 13 classifies the lane into the straight lane, the curved lane, and the clothoid curve lane by analyzing the lane 200 with the lane segment to perform the lane matching applying the lane segment to a road map 31 of the precision map storage 30, and the map matching processor 15 calculates a movement amount calculation value in each of the straight lane, the curved lane, and the clothoid curve lane to generate the movement amount calculation value as a covariance matrix to provide the generated covariance matrix to a position updater 53 of the vehicle state estimator 50.

Particularly, the controller 10 has a memory for storing a logic or a program for the generating of the lane image information (S10), the generating of the lane classification information (S20), the geometric feature-based map matching (S30-1, S30-2), the optimization-based map matching (S30-3), and the estimating of the vehicle position (S40), and is operated by a central processing unit.

As an example, the sensor 20 is composed of a camera 21 and a vehicle sensor 23, in which the camera 21 captures a forward region image of the road 100 on which the autonomous vehicle 1 travels, and the vehicle sensor 23 is composed of a vehicle speed sensor for detecting the vehicle speed of the autonomous vehicle 1 and an acceleration sensor for calculating a yaw rate of the autonomous vehicle 1.

As an example, the precision map storage 30 stores the road map 31 provided to the road perception unit 1/1 of the controller 10, and the road map 31 is an autonomous traveling precision map (HD map) having the high precise positioning accuracy and reliability of 10 to 20 cm.

As an example, the vehicle position perception unit 40 perceives a lane image from the forward region image of the camera 21, and confirms each of the vehicle speed of the vehicle speed sensor and the yaw rate of the acceleration sensor. Particularly, the vehicle position perception unit 40 may provide the lane image to the road perception unit 11 of the controller 10 to match the captured lane image with the road map 31 of the precision map storage 30.

As an example, the vehicle state estimator 50 is composed of a position predictor 51 and a position updater 53, in which the position predictor 51 predicts the position information within the road of the autonomous vehicle 1 by the vehicle speed and yaw rate of the vehicle position perception unit 40, and the position updater 53 corrects and updates the position information of the position predictor 51 with any one lane information of the straight line, the curved line, and the clothoid curve provided by the map matching processor 15 of the controller 10.

As an example, the signal output unit 60 controls the road traveling of the autonomous vehicle 1 with the position update information within the road provided by the position updater 53 of the vehicle state estimator 50. Particularly, the signal output unit 60 configures the system output as the estimation position of the vehicle and a covariance matrix.

Hereinafter, the high precision position estimation method through the road shape classification-based map matching will be described in detail with reference to FIGS. 2 to 9. In this case, a control subject is the controller 10, the vehicle state estimator 50, and the signal output unit 60, and a control target is the autonomous vehicle 1. In this case, a controller area network (CAN) may be used for the date transmission/reception.

First, the controller 10 generates traveling road image information through the generating of the lane image (S10).

Referring to FIG. 2, the controller 10 fetches the vehicle speed detected by the vehicle sensor 23 and the yaw rate by the acceleration sensor together with the road forward region image of the road 100 captured by the camera 21 among the sensors 20 in the road perception unit 11 as input information in the vehicle position perception unit 40, and fetches the autonomous traveling precision map (HD map) in the road map 31 of the precision map storage 30.

In this case, the road perception unit 11 is composed of the lane segment obtained by the perception sensor of the camera 21 and the segment within a vehicle position reference region of interest (ROI) among the lane landmarks for the autonomous traveling precision map (HD map) of the road map 31.

Figure 3:
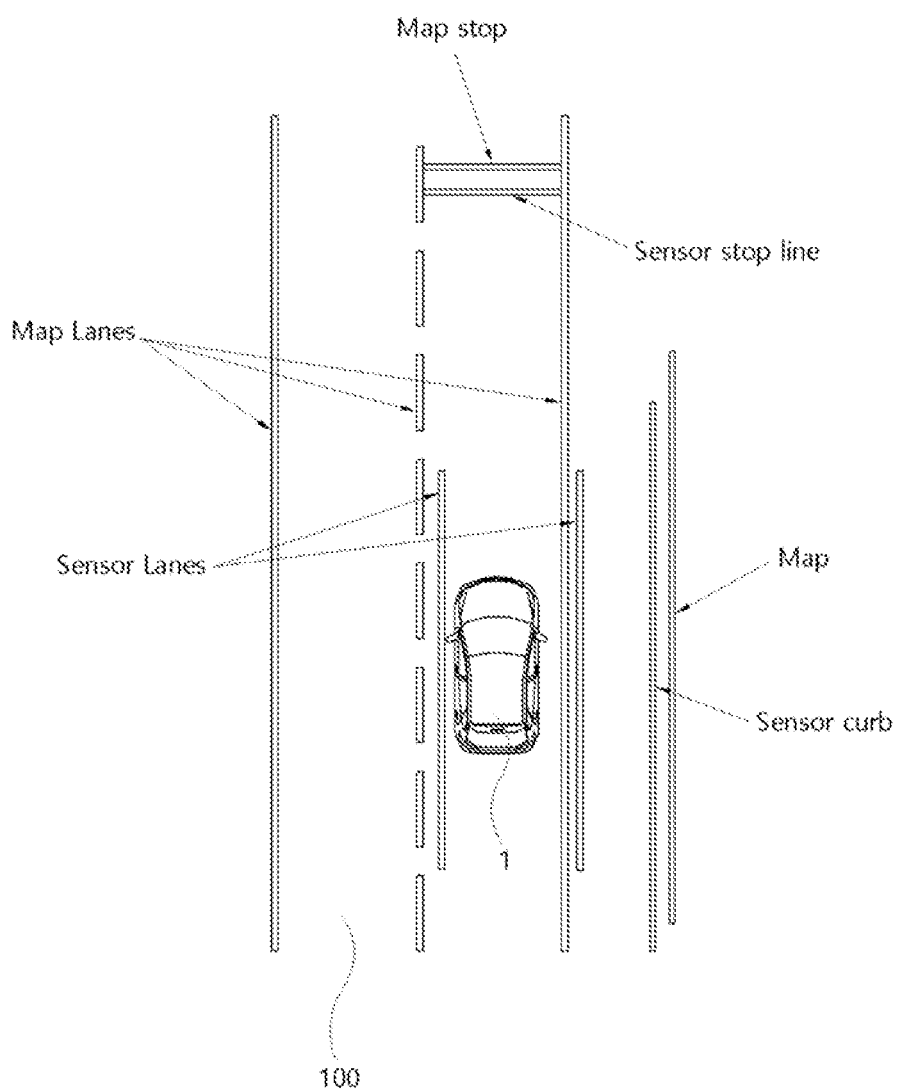
FIG. 3 is a diagram illustrating an example of road information measured by the high precision position estimation system in some forms of the present disclosure.

FIG. 3 illustrates an example of the landmarks which may be extracted as the segments by the camera 21 and the road information of the autonomous traveling precision map (HD map).

As illustrated, as the landmarks which may be confirmed by matching the sensor lanes of the road 100 on which the autonomous vehicle 1 travels with the map lanes of the autonomous traveling precision map (HD map), the comparison of the stop lines of a map stop line—a sensor stop line and the curved line comparison of the map curb—the sensor curb are illustrated.

Therefore, it is illustrated that the shape classification algorithm may not be applied by matching the landmark with the ratio.

As an example, since the stop line is configured as the straight line, it may be seen that as the geometric feature-based map straight line matching technique (S30-1) of the geometric feature-based map matching (S30-1, S30-2), the map matching and covariance estimation technique for the straight line shape may be applied, and this means that the same technique may also be applied to all perceivable landmarks configured in the polyline form such as a curb stone.

Figure 4:
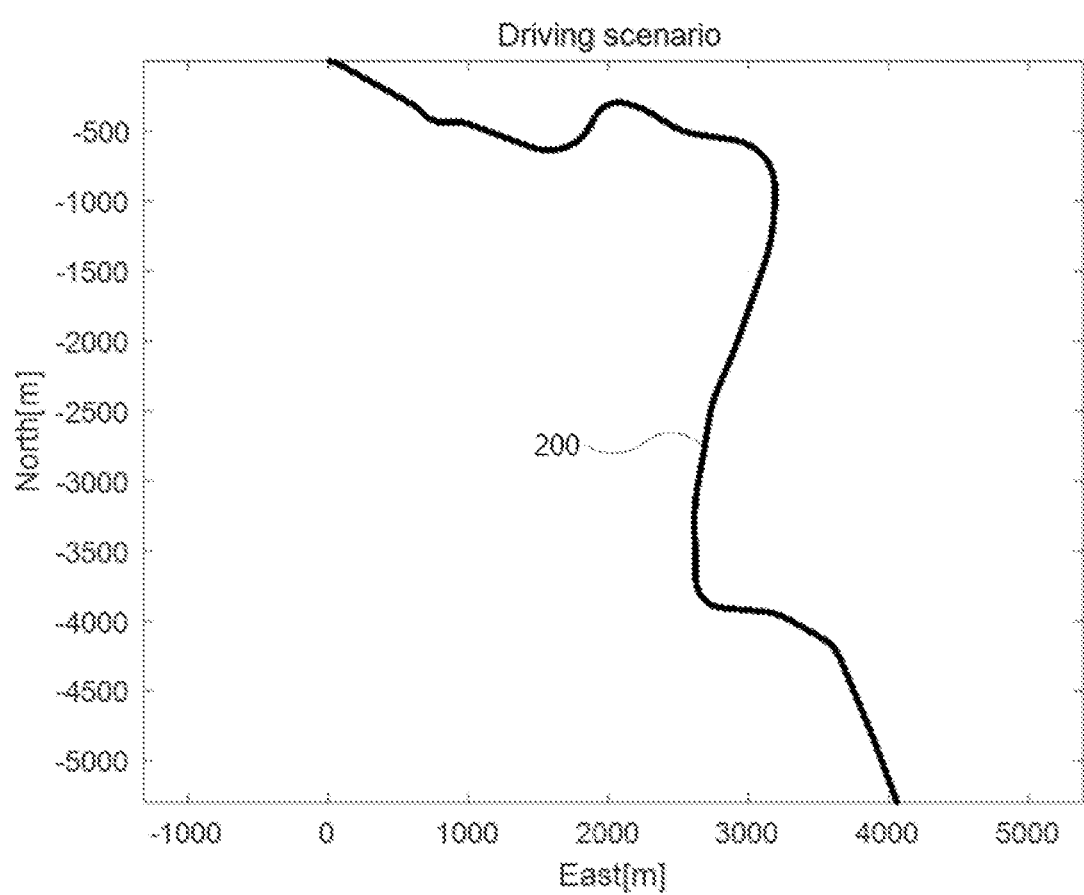
FIG. 4 is a diagram illustrating an example of the road including various curvatures in some forms of the present disclosure.

FIG. 4 illustrates that the road 100 may include the lane 200 having various curvatures.

Then, the controller 10 performs the lane classification which classifies the lane of the traveling road into any one of the straight line, the curved line (e.g., the lane having the circular arc shape having a constant curvature), and the clothoid curve by applying the generating of the lane classification information (S20).

To this end, the generating of the lane classification information (S20) is composed of confirming the lane segment (i.e., the landmark) of the HD map information and the road image information (S21), and classifying the segment-based lane (S22 to S28).

Referring to FIG. 2, the controller 10 uses a lane segment association of a first part and a lane shape classification of a second part of the lane classifier 13.

As an example, the lane segment association of the first part determines a perception segment using the lane 200 confirmed by the captured image of the road 100 as an input lane of the system in order to read the information of the road perception unit 11 to determine a pair of segments to be applied to the map matching according to the shape of the road of the autonomous traveling precision map (HD map) of the road map 31, and outputs a pair of lane segments by associating the classified autonomous traveling precision map (HD map) and perception segments such that the classified autonomous traveling precision map (HD map)

and perception segments are matched with the closest segments using the road shape classification algorithm.

As an example, the lane shape classification of the second part classifies and outputs a pair of associated lane segments into three types of the straight line, the curved line (or the circular arc), and the clothoid curve according to the road shape.

Therefore, the confirming of the lane segment of the HD map information and the road image information (S21) generates a pair of lane segments associated with the lane 200 confirmed by the captured image of the road 100 using the landmark on the road of the autonomous traveling precision map (HD map).

Therefore, the classifying of the segment-based lane (S22 to S28) includes matching an input lane segment straight line (S22), confirming a straight lane (S23, S24), matching an input lane segment curved line (S25), confirming a curved lane (S26, S27), and confirming a clothoid curve lane (S28).

As described above, the classifying of the segment-based lane (S22 to S28) classifies the straight lane (S24) by the confirming of the straight lane (S23) in the matching of the input lane segment straight line (S22), and classifies the curved lane (S27) or classifies the clothoid curve lane (S28) by the confirming of the curved lane (S26) in the matching of the input lane segment curved line (S25).

Figure 5:
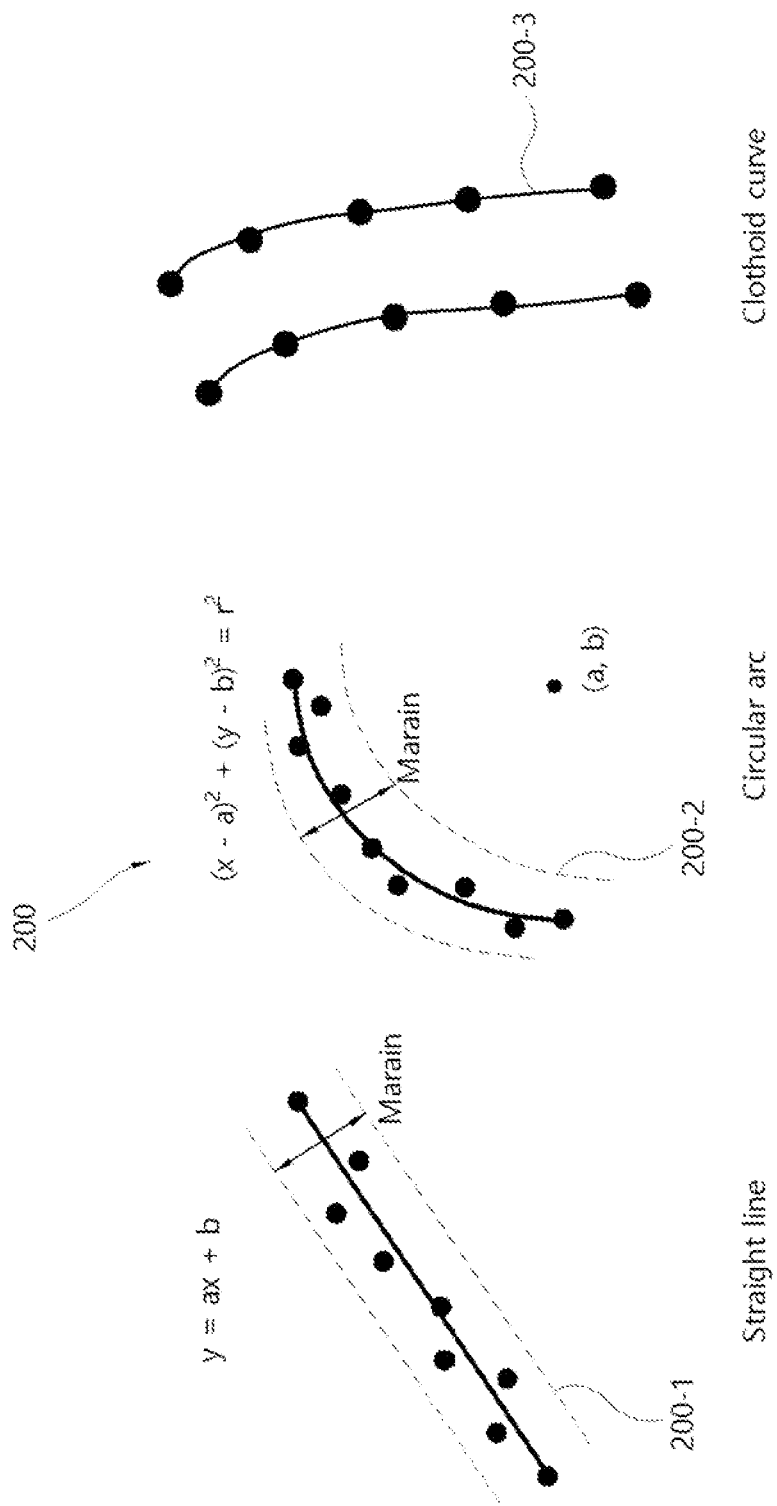
FIG. 5 is a diagram illustrating a map mapping example of the straight lane/curved lane/clothoid curve lane of the road in some forms of the present disclosure.

FIG. 5 illustrates a straight lane 200-1, a curved lane 200-2, and a clothoid curve lane 200-3 for the lane 200. In this case, the classification algorithm applied to the classifying of the matching lane segment (S22 to S28) is a method for associating the precision map lane segment which is the closest distance with respect to all classified perceivable lane segments, and applying the matching technique only if the shapes of two segments are the same.

As illustrated, FIG. 5 illustrates that the classification algorithm classifies the lane into the type of the straight lane 200-1 when all points of the segment are within the straight model region generated by the start point and the end point, classifies the lane into the circular arc type of the curved lane 200-2 when all points of the segment are within the circle model region generated by the start point/the middle point/the end point in the case of being not classified as the straight line, and classifies the lane into the type of the clothoid curve lane 200-3 in the case of not corresponding to all two types.

Subsequently, the controller 10 performs the map-sensor blending processing (S30-1 to S30-3), in which the map-sensor blending processing (S30-1 to S30-3) applies the geometric feature-based map straight line matching technique (S30-1) to the straight lane 200-1, applies the geometric feature-based map curved line matching technique (S30-2) to the curved lane 200-2, and applies the optimization-based map matching technique (S30-3) to the clothoid curve lane 200-3.

Referring to FIG. 2, the controller 10 uses the map matching processor 15, in which the map matching processor 15 outputs the matching result to the vehicle state estimator 50 by applying different map matching and covariance estimation techniques according to the road shape to the pair of associated lane segments of the lane classifier 13.

FIG. 6 illustrates that the geometric feature-based map straight line matching technique (S30-1) and the geometric feature-based map curved line matching technique (S30-2) may have the under-constrained shape according to the classified shape for all pairs of classified and associated segments, thereby applying the technique using the geometric feature.

As an example, the geometric feature-based map straight line matching technique (S30-1) applied to the straight lane 200-1 generates two straight line models for the sensor straight lane of the captured image confirmed by the association of the segments and the map straight lane of the autonomous traveling precision map (HD map) and then calculates a rotational angle through the slope difference, and calculates the shortest distance movement amount corresponding to the shortest distance between two straight lines. In this case, the covariance estimates the vehicle position to be in proportion to the length of the precision map lane segment of the autonomous traveling precision map (HD map).

Therefore, the geometric feature-based map straight line matching technique (S30-1) includes generating two straight line models for the straight lane 200-1 (S31-1), calculating the straight line slope difference between the two straight lines (S32-1), calculating the rotational angle (S33-1), estimating the covariance (S34-1), and calculating the shortest distance movement amount of the straight line (S35-1). As a result, the straight lane 200-1 may generate a covariance matrix of a COV (X, Y) removing the under-constrained shape matching error with respect to the shortest distance movement amount of the straight line by the covariance, which is the criterion of measuring the aspect in which two probability variables configuring the combined probability distribution are changed.

As an example, the geometric feature-based map curved line matching technique (S30-2) applied to the curved lane 200-2 generates two circle models for the sensor straight lane of the captured image confirmed by the association of the segments and the map straight lane of the autonomous traveling precision map (HD map) and then calculates a tangent line made based on the point close to the vehicle shaft of the rear of the vehicle, calculates the rotational angle through the difference between two tangent lines, and calculates the shortest distance movement amount corresponding to the shortest distance between the two tangent lines. In this case, the covariance estimates the vehicle position to be in proportion to the length of the precision map lane segment of the autonomous traveling precision map (HD map).

Therefore, the geometric feature-based map curved line matching technique (S30-2) includes generating two circle models for the curved lane 200-2 (S31-2), calculating a circle tangent line for two circles (S32-2), calculating the rotational angle (S33-2), estimating the covariance (S34-2), and calculating the shortest distance movement amount of the curved line (S35-2).

As a result, the curved lane 200-2 may generate the covariance matrix of the COV (X, Y) removing the under-constrained shape matching error with respect to the shortest distance movement amount of the curved line by the covariance, which is the criterion of measuring the aspect in which two probability variables configuring the combined probability distribution are changed.

On the other hand, the optimization-based map matching technique (S30-3) applied to the clothoid curve lane 200-3 applies the iterative closest point (ICP) algorithm and the related covariance estimation technique as the optimization-based map matching technique using the feature having a sufficient constraint condition.

In this case, the ICP algorithm is one of the methods for registering current data in the conventional data set, and as method for finding the association using the closest point of the respective data and moving and rotating the current data according to the association to add the conventional data set, the ICP algorithm is a method generally applied to the method for simulating the matching process between the map model and the data measured by a laser scanner.

Therefore, the optimization-based map matching technique (S30-3) includes applying the ICP to the clothoid curve lane 200-3 (S31-3), performing the covariance estimation (S34-3), and calculating the optimization movement amount of the clothoid curve (S35-3). As a result, the clothoid curve lane 200-3 is generated by the covariance matrix of the COV (X, Y) with respect to the optimization movement amount of the clothoid curve by the covariance, which is the criterion of measuring the aspect in which two probability variables configuring the combined probability distribution are changed.

Finally, the controller 10 performs the estimating of the vehicle position (S40), and calculates the latitude, the longitude, the traveling direction, and the like of the vehicle, which are the states to be estimated by blending the sensor within the vehicle of the autonomous vehicle 1 and the map matching measurement through the estimating of the vehicle position (S40).

Referring to FIG. 2, the controller 10 outputs the result of the map matching processor 15 to the vehicle state estimator 50.

Therefore, the vehicle state estimator 50 receives the vehicle speed and the yaw rate from the vehicle sensor 23, and receives a straight line shortest distance movement amount calculation value (S35-1) obtained by the geometric feature-based map straight line matching technique (S30-1), a curved line shortest distance movement amount calculation value (S35-2) of the geometric feature-based map curved line matching technique (S30-2), or a clothoid curve optimization movement amount calculation value (S35-3) of the optimization-based map matching technique (S30-3) as the covariance matrix from the map matching processor 15.

Figure 7:
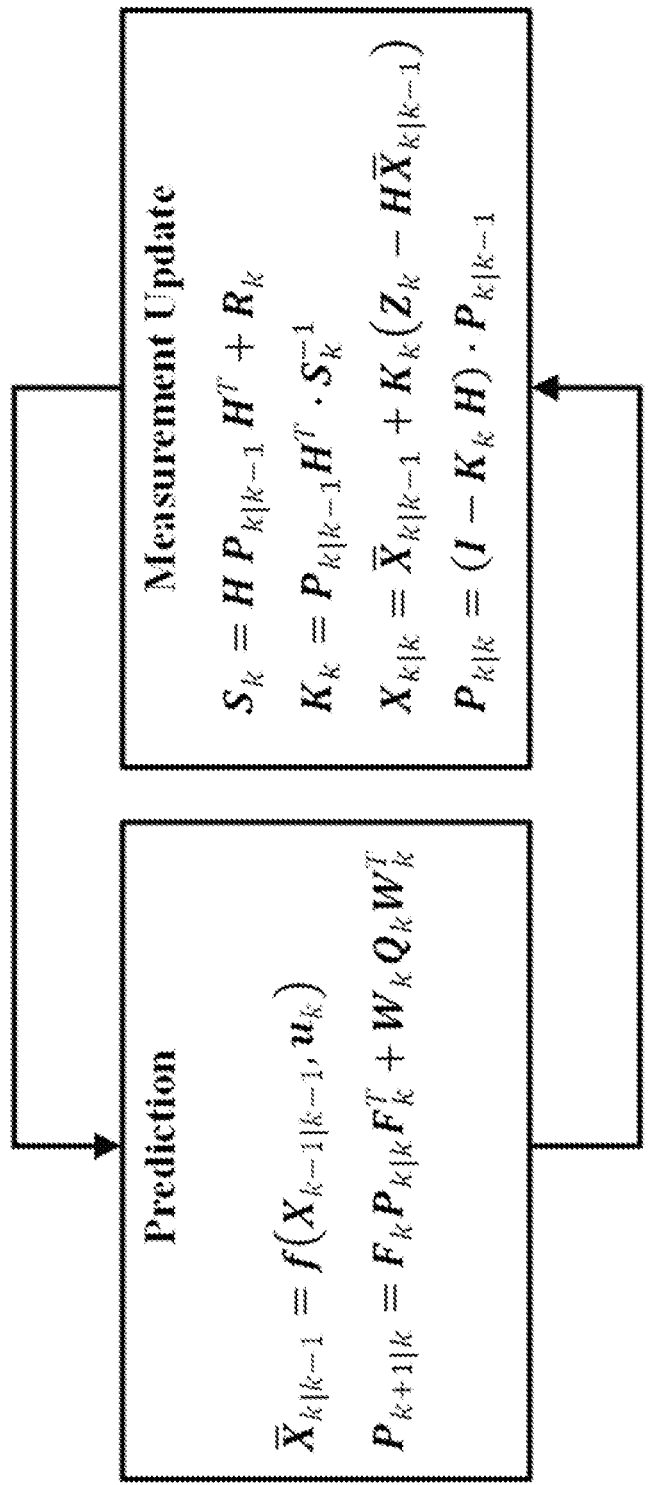
FIG. 7 is a diagram illustrating an example of estimating the position of the autonomous vehicle by blending a vehicle sensor and the map matching measurement in some forms of the present disclosure.

Referring to FIG. 7, the vehicle state estimator 50 applies an extended Kalman filter (EKF), such that the position predictor 51 and the position updater 53 are mutually cooperated. In this case, the position predictor 51 means the prediction step of the EKF, and the position updater 53 means the measurement update step (or the correction step) of the EKF.

As an example, the position predictor 51 calculates the estimation position as the result of performing the prediction step to which a dead reckoning technique is applied using, as an input, the yaw rate and the wheel speed of the sensor 20 within the vehicle from the previous estimation position. This case is the reckoning state which estimates the dead state not receiving the signal and means that the state information is updated by the guessing while there is no signal.

As an example, the position updater 53 calculates the precise position as the result of performing the measurement update step of blending the covariance matrix of the straight line shortest distance movement amount calculation value (S35-1), the covariance matrix of the curved line shortest distance movement amount calculation value (S35-2), or the covariance matrix of the clothoid curve optimization movement amount calculation value (S35-3) with the estimation position calculated by the position predictor 51 to estimate the covariance matrix for the precise position.

As described above, the extended Kalman filter is classified into the prediction step and the measurement update step, in which the prediction step may calculate the previous estimation position, and the measurement update step may predict the estimation position by blending the previous estimation position with the covariance matrix.

Therefore, the estimating of the vehicle position (S40) includes detecting (or reading) vehicle sensor information (S41), confirming a vehicle previous estimation position (S42), predicting a vehicle estimation position (S43), updating the vehicle estimation position (S44), and outputting vehicle traveling information (e.g., a latitude, a longitude, and a traveling direction) (S45). In this case, the outputting of the vehicle traveling information (e.g., a latitude, a longitude, and a traveling direction)(S45) is provided to the signal output unit 60.

Meanwhile, the autonomous vehicle control (S50) is the real motion of the autonomous vehicle 1 traveling on the road 100, and this is implemented by the latitude, the longitude, and the traveling direction, which are the output values of the signal output unit 60.

Figure 8:
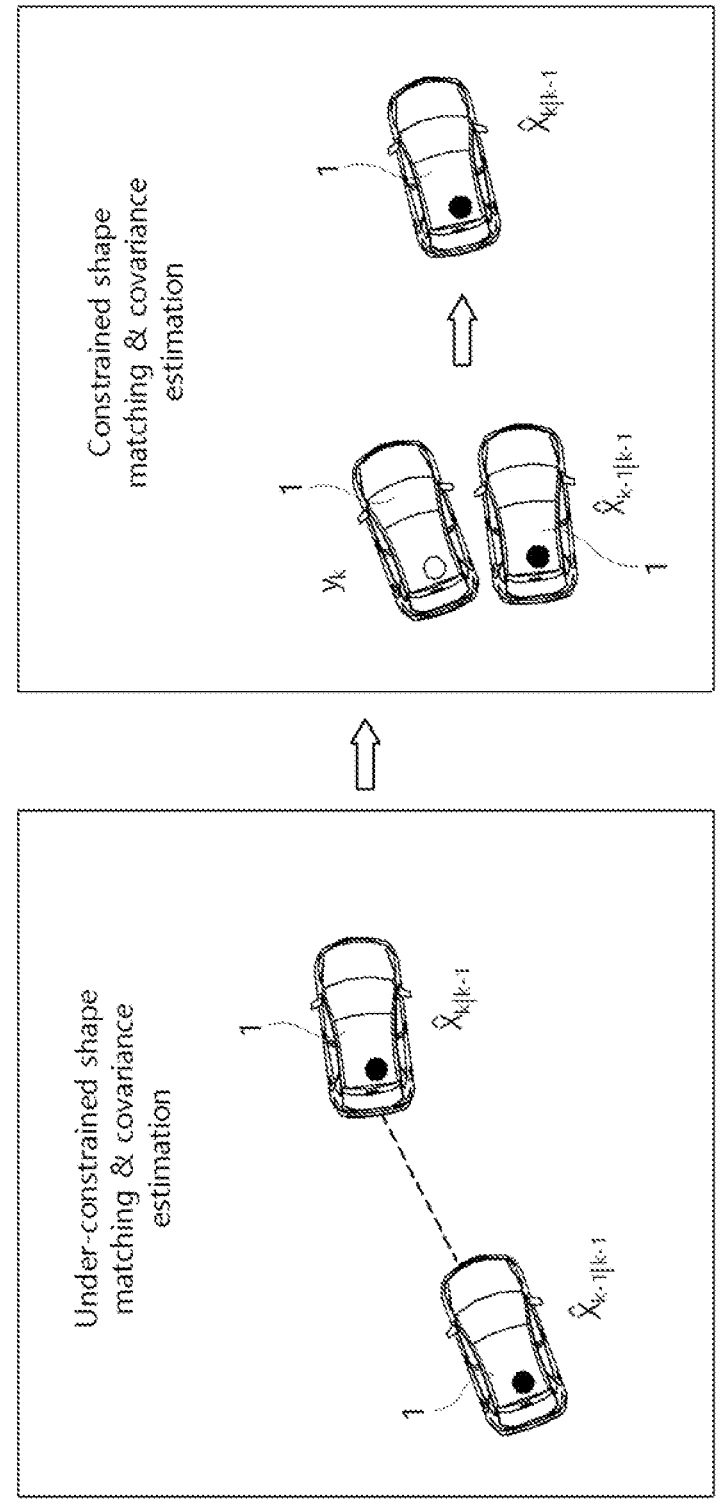
FIG. 8 is a diagram illustrating the state where the autonomous vehicle in some forms of the present disclosure is controlled by the high precision position estimation result.

Referring to FIG. 8, the right drawing in FIG. 8 illustrates that the results of the constrained shape matching and the covariance estimation are different by applying the latitude, the longitude, and the traveling direction, which are the result of the state estimation based on the extended Kalman filter (EKF) compared to the traveling state by the current position information illustrated in the left drawing in FIG. 8 with respect to the traveling of the autonomous vehicle 1.

Figure 9:
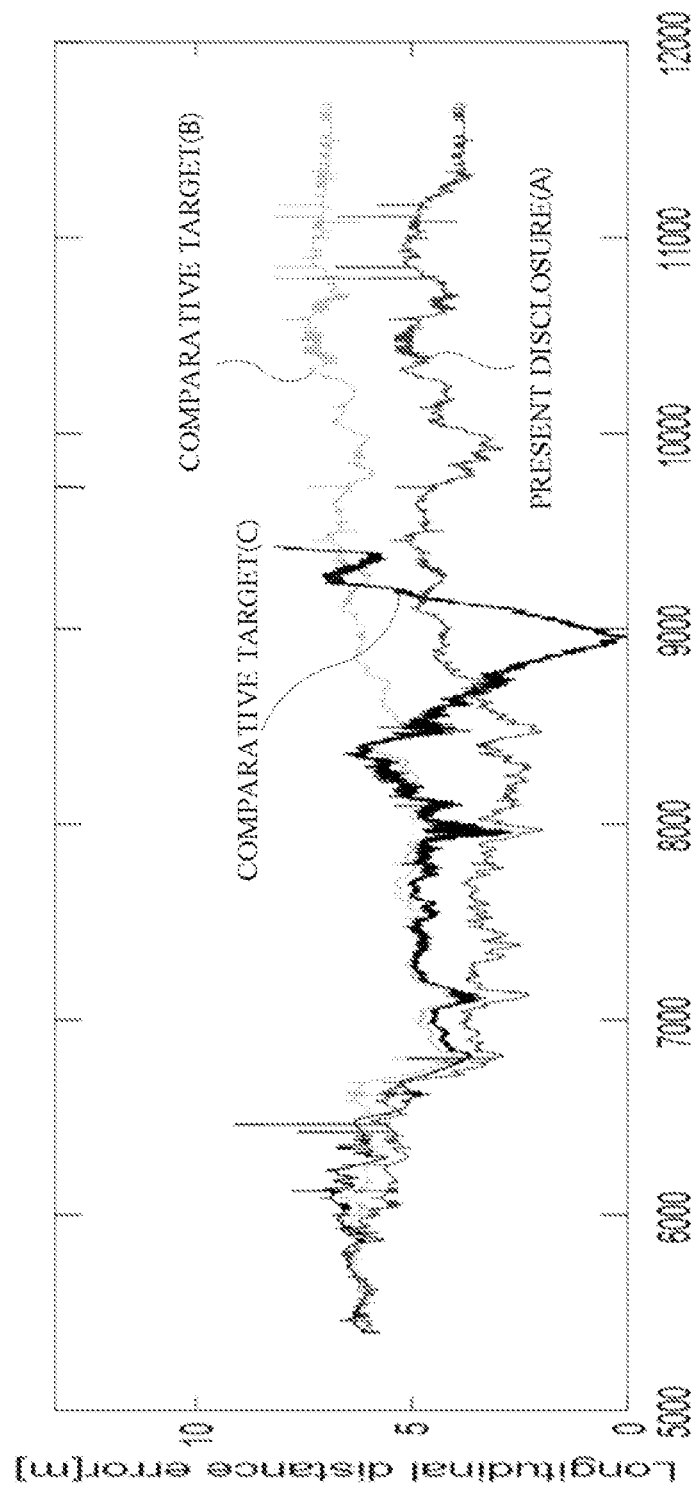
FIG. 9 is a simulation line diagram illustrating that the autonomous vehicle in some forms of the present disclosure has the longitudinal root mean square error (RMSE) improved by about 20% compared to the comparison target through the high precision position estimation result.

Particularly, FIG. 9 illustrates that the present disclosure (A) applying the high precision position estimation result may improve the longitudinal root mean square error (RMSE) by about 20% from the simulation analysis result compared to a comparative target (B) and a comparative target (C) representing the position estimation results by the conventional technique which does not match the longitudinal component in order to avoid the under-constrained problem in the autonomous vehicle 1.

As described above, the high precision position estimation method through the road shape classification-based map matching implemented by the high precision position estimation system 1-1 of the autonomous vehicle 1 according to the present exemplary form classifies, by the controller 10, the lane of the road 100 into any one of the straight lane, the curved lane, and the clothoid curve lane by lane-matching the sensor lane segment confirmed by the lane image information of the camera 21 with the map lane segment of the autonomous traveling precision map, generates the movement amount calculation values of geometric feature-based map matching techniques for the straight lane and the curved lane and the movement amount calculation value of the optimization-based map matching technique for the clothoid curve lane as the covariance matrix, and blends the sensor measurement value of the vehicle speed and the yaw rate of the vehicle sensor 23 with the covariance matrix using the extended Kalman filter to calculate and output one or more among the latitude, the longitude, and the traveling direction of the vehicle as the state value to be estimated.

As described above, the high precision position estimation method through the road shape classification-based map matching removes the matching error caused by the under-constrained shape for the straight and curved (or circular arc) lanes in the matching process for the road 100 by the road shape classification-based map matching, and particularly, also improves the precise positioning precision and stability by the removal of the under-constrained shape matching error applying the under-constrained shape classification, the geometric shape-based map matching, and the covariance estimation.

What is claimed is:

1. A high precision position estimation method through a road shape classification-based map matching, the method comprising:

generating lane classification information by:
  performing, by a controller, the lane matching between a sensor lane segment of lane image information and a map lane segment of an autonomous traveling precision map, wherein the controller is configured to read the lane image information of a road generated by a camera in an autonomous vehicle; and
  classifying the lane of the road into a straight lane, a curved lane, and a clothoid curve lane;
processing a map-sensor combining by:
  calculating straight line and curved line movement amounts by applying a geometric feature-based map matching to the straight lane and the curved lane;
  calculating a clothoid curve movement amount by applying an optimization-based map matching to the clothoid curve lane;
  generating a covariance matrix with the straight line and curved line movement amounts or the clothoid curve movement amount;
  calculating a vehicle state value based on the covariance matrix; and
  classifying the geometric feature-based map matching into a geometric feature-based map straight line matching applied to the straight lane, a geometric feature-based map curved line matching applied to the curved lane, and an optimization-based map matching applied to the clothoid curve lane,
  wherein the geometric feature-based map curved line matching comprises:
    generating two circle models for the curved lane;
    calculating a circle tangent line between the two circles;
    calculating a rotational angle from the difference between the circle tangent lines;
    performing the covariance estimation for the rotational angle; and
    generating the movement amount as the covariance matrix by calculating the movement amount as the shortest distance movement amount of the curved line;
  wherein the optimization-based map matching comprises:
    applying an iterative closest point (ICP) for the clothoid curve lane;
    performing the covariance estimation when the ICP is applied; and
    generating the movement amount as the covariance matrix by calculating the movement amount as an optimization movement amount of the clothoid curve, and
controlling, by an output unit, motion of the autonomous vehicle using the calculated vehicle state value.

2. The high precision position estimation method of claim 1, wherein the generating of the lane classification information comprises:
  performing the lane matching with the sensor lane segment based on the map lane segment that is confirmed by reading the autonomous traveling precision map; and
  classifying the segment-based lane, by generating an input lane segment, and determining the straight lane, the curved lane, or the clothoid curve lane based on the classified lane.

3. The high precision position estimation method of claim 2, wherein the classifying of the segment-based lane comprises:
  determining the straight lane from the input lane segment; and
  determining the curved lane or the clothoid curve lane from the input lane segment.

4. The high precision position estimation method of claim 3, further comprising:
  determining the straight lane when all points of the input lane segment are within a straight line model region generated by the start point and the end point.

5. The high precision position estimation method of claim 3, further comprising:
  determining the curved lane when all points of the input lane segment are within a circle model region generated by the start point, the middle point, and the end point.

6. The high precision position estimation method of claim 3, further comprising:
  determining the clothoid curve lane when all points of the input lane segment do not have the start point and the end point or the start point, the middle point, and the end point.

7. The high precision position estimation method of claim 1, wherein the geometric feature-based map straight line matching comprises:
  generating two straight line models for the straight lane;
  calculating the straight line slope difference between the two straight lines;
  calculating a rotational angle from the straight line slope difference;
  performing the covariance estimation for the rotational angle; and
  generating the movement amount as the covariance matrix by calculating the movement amount as the shortest distance movement amount of the straight line.

8. The high precision position estimation method of claim 1, wherein the method further comprises:
  estimating a vehicle position by:
    combining the covariance matrix with the sensor measurement value of a vehicle speed and a yaw rate generated by a vehicle sensor by an extended Kalman filter; and
    calculating at least one of latitude, longitude, or traveling direction of the autonomous vehicle when the vehicle state value is estimated by a vehicle state estimator that is configured to receive the covariance matrix from the controller.

9. The high precision position estimation method of claim 8, wherein the estimating of the vehicle position comprises:
  confirming a previous estimation position for the autonomous vehicle with the sensor measurement value;
  performing the estimation position prediction by combining the covariance matrix with the previous estimation position by the extended Kalman filter; and
  updating and outputting a value of the estimation position prediction as vehicle traveling information.

10. The high precision position estimation method of claim 9, wherein the confirmation of the previous estimation position comprises:
  confirming the previous estimation position by a dead reckoning.

11. The high precision position estimation method of claim 9, further comprising:
  classifying the extended Kalman filter into a prediction step and a measurement update step; and
  calculating the previous estimation position, and combining the covariance matrix with the previous estimation position.

12. The high precision position estimation method of claim 9, wherein the vehicle traveling information is at least one of the latitude, the longitude, or the traveling direction of the autonomous vehicle.

13. An autonomous vehicle comprising:
a sensor configured to:
generate lane image information for a road; and
detect a vehicle speed and a yaw rate as sensor measurements;
a precision map storage having a road map of an autonomous traveling precision map;
a high precision position estimation system configured to calculate and output at least one of latitude, longitude, or traveling direction of a vehicle; and
an output unit configured to control motion of the autonomous vehicle using the at least one of the latitude, the longitude, or the traveling direction of the vehicle,
wherein the high precision position estimation system comprises:
a controller configured to:
classify a lane into a straight lane, a curved lane, and a clothoid curve lane by the lane matching a sensor lane segment of the lane image information with a map lane segment of the autonomous traveling precision map;
generate the movement amount calculation values of geometric feature-based map matching for the straight lane and the curved lane; and
generate the movement amount calculation value of an optimization-based map matching for the clothoid curve lane as a covariance matrix;
classify the geometric feature-based map matching into a geometric feature-based map straight line matching applied to the straight lane, a geometric feature-based map curved line matching applied to the curved lane, and an optimization-based map matching applied to the clothoid curve lane,
wherein the geometric feature-based map curved line matching comprises:
generating two circle models for the curved lane;
calculating a circle tangent line between the two circles;
calculating a rotational angle from the difference between the circle tangent lines;
performing the covariance estimation for the rotational angle; and
generating the movement amount as the covariance matrix by calculating the movement amount as the shortest distance movement amount of the curved line;
wherein the optimization-based map matching comprises:

applying an iterative closest point (ICP) for the clothoid curve lane;
performing the covariance estimation when the ICP is applied; and
generating the movement amount as the covariance matrix by calculating the movement amount as an optimization movement amount of the clothoid curve; and
a vehicle state estimator configured to:
perform the estimation position prediction by combining the sensor measurement value with the covariance matrix by an extended Kalman filter; and
calculate and output the latitude, the longitude, and the traveling direction by the estimation position prediction.

14. The autonomous vehicle of claim 13, wherein the controller further comprises:
a road detection unit configured to detect the sensor lane segment and the map lane segment;
a lane classifier configured to classify the lane into the straight lane, the curved lane, and the clothoid curve lane by the lane matching applying the lane segment; and
the vehicle state estimator configured to:
calculate a movement amount calculation value from each of the straight lane, the curved lane, and the clothoid curve lane to generate the movement amount calculation values as the covariance matrix; and
provide the covariance matrix to the vehicle state estimator.

15. The autonomous vehicle of claim 14, wherein the controller is configured to:
receive the sensor lane segment of the lane image information from a vehicle position detection unit that is connected to the camera and the vehicle sensor.

16. The autonomous vehicle of claim 13, wherein the vehicle state estimator further comprises:
a position predictor configured to calculate a previous estimation position using the sensor measurement value; and
a position updater configured to perform the estimation position prediction by combining the previous estimation position with the covariance matrix.

17. The autonomous vehicle of claim 16, further comprising:
a signal output unit is configured to perform a vehicle control using the latitude, the longitude, and the traveling direction, wherein the vehicle state estimator is connected to the signal output unit.

* * * * *